United States Patent
Porcel Magnusson (10) Patent No.: US 11,346,949 B2
(45) Date of Patent: May 31, 2022

(54) OBTAINING DATA FROM TARGETS USING IMAGERY AND OTHER REMOTE SENSING DATA

(71) Applicant: SKANSENSE S.L.U., Leganés (ES)

(72) Inventor: Cristina Porcel Magnusson, Madrid (ES)

(73) Assignee: SKANSENSE S.L.U.

( * ) Notice: Subject to any disclaimer, the term of this patent is extended or adjusted under 35 U.S.C. 154(b) by 362 days.

(21) Appl. No.: 15/769,322

(22) PCT Filed: Oct. 11, 2016

(86) PCT No.: PCT/EP2016/074375
§ 371 (c)(1),
(2) Date: Apr. 18, 2018

(87) PCT Pub. No.: WO2017/067824
PCT Pub. Date: Apr. 27, 2017

(65) Prior Publication Data
US 2018/0306923 A1   Oct. 25, 2018

(30) Foreign Application Priority Data

Oct. 19, 2015 (EP) .................... 15382513.8

(51) Int. Cl.
| G01S 17/74 | (2006.01) |
| G01S 17/89 | (2020.01) |
| G01S 17/06 | (2006.01) |
| G01S 17/66 | (2006.01) |
| G06K 9/32  | (2006.01) |

(52) U.S. Cl.
CPC .............. *G01S 17/74* (2013.01); *G01S 17/06* (2013.01); *G01S 17/66* (2013.01); *G01S 17/89* (2013.01); *G06K 9/3233* (2013.01)

(58) Field of Classification Search
CPC .......... G01S 17/74; G01S 17/06; G01S 17/66; G01S 17/89
See application file for complete search history.

(56) References Cited

U.S. PATENT DOCUMENTS

| 6,025,200 A  | 2/2000 | Kaish  |
| 8,975,585 B2 | 3/2015 | Hiebl  |
| 9,057,712 B1 | 6/2015 | Fraser |

(Continued)

FOREIGN PATENT DOCUMENTS

| CN | 102682606 A1 | 9/2012 |
| JP | 2004043212 A1 | 2/2004 |

(Continued)

OTHER PUBLICATIONS

International Search Report and Written Opinion dated Dec. 22, 2016 for PCT/EP2016/074375, 20 pages.

(Continued)

*Primary Examiner* — Marc Anthony Armand
(74) *Attorney, Agent, or Firm* — Fresh IP PLC; Clifford D. Hyra; Aubrey Y. Chen (57) ABSTRACT

The present disclosure relates to a method of tagging at least one target with an artificial physical tag configured to provide a signature of interest for imaging technology in any region of the electromagnetic spectrum. The method may comprise associating the artificial physical tag to the target.

43 Claims, 5 Drawing Sheets

(56) References Cited

U.S. PATENT DOCUMENTS

| | | | |
|---|---|---|---|
| 2008/0042830 A1* | 2/2008 | Chakraborty | G06K 7/0008 340/540 |
| 2012/0035884 A1 | 2/2012 | Ingram et al. | |
| 2012/0190455 A1* | 7/2012 | Briggs | A63F 13/332 463/42 |
| 2014/0061478 A1* | 3/2014 | Hiebl | G01S 17/50 250/342 |
| 2014/0152840 A1 | 6/2014 | McCloskey et al. | |
| 2014/0282974 A1* | 9/2014 | Maher | H04L 9/3271 726/7 |
| 2015/0012307 A1* | 1/2015 | Moss | G06Q 10/02 705/5 |
| 2015/0019098 A1* | 1/2015 | Schrabler | G06K 7/12 701/70 |
| 2015/0235064 A1* | 8/2015 | Johannesen | G06Q 10/087 340/10.1 |
| 2015/0370255 A1* | 12/2015 | Harvey | G05D 1/0027 701/24 |
| 2016/0260328 A1* | 9/2016 | Mishra | G08G 1/166 |

FOREIGN PATENT DOCUMENTS

| | | |
|---|---|---|
| JP | 2008509442 A | 3/2008 |
| JP | 2013156004 A | 8/2013 |
| WO | 2006/016094 | 2/2006 |

OTHER PUBLICATIONS

The result of a Consultation with the European Patent Office for patent application EP3365701A1, mailed on Jan. 19, 2021.
Office Action for Japanese Application 2018-538934, dated Jan. 5, 2021.
Search report from Intellectual Property Office of Singapore for application: 11201909024X, dated Feb. 19, 2021.
Written Opinion from Intellectual Property Office of Singapore for application: 11201909024X, dated Feb. 19, 2021.
Porcel Magnusson, Unsettled Topics Concerning Coating Detection by LiDAR in Autonomous Vehicles, SAE EDGE Research Report, Jan. 18, 2021, SAE International, Warrendale, Pennsylvania, U.S.
Hayakawa, Notification of Reasons for Refusal, Japanese Patent Application 2018-538934, dated Jun. 22, 2021.
Royo, An Overview of Lidar Imaging Systems for Autonomous Vehicles, Applied Sciences, 2019.
Seubert, The Future of Coatings.

* cited by examiner

OBTAINING DATA FROM TARGETS USING IMAGERY AND OTHER REMOTE SENSING DATA

FIELD OF THE INVENTION

The present disclosure relates to remote sensing and imagery data analysis and more specifically to a method of tagging at least one target with an artificial physical tag, and to methods, systems and computer programs for obtaining data from acquired imagery and/or data related to at least one target, for remote sensing of at least one target and for finding at least one target or data related to the target.

This application claims the benefit of European Patent Application EP 15382513.8 filed Oct. 19, 2015.

BACKGROUND

Remote sensing imagery analysis often includes object tagging after the imagery acquisition. Tagging satellite images helps getting greater benefit of imagery databases thanks to extracting meaningful information. This information may be correlated to other spatial and non-spatial information useful for commerce and trade.

Said tagging process of the imagery data may be done through automated image processing or manually, depending on the accuracy needed. Although human-in-the-loop processing increases the accuracy of the data, in both cases tasks of the process are time consuming and the data accuracy is limited.

On the other hand, use of spectral properties of the materials in nature for GIS search and for environmental applications are known.

Finally, RFID technologies may track objects of a target based on spectral signatures. Said RFID solution has important distance limitations even in the active, powered systems and has electronic requirements for the tags, in most cases circuits and in all cases needs an antenna or uses the target as an antenna.

SUMMARY OF THE INVENTION

In a first aspect, a method of tagging at least one target with an artificial physical tag configured to provide a signature of interest for imaging technology in any region of the electromagnetic spectrum is disclosed. The method may comprise associating the artificial physical tag to the target.

This way, the artificial physical tag tagged to the target may provide a signature that may be easily recognized by automated or semi-automated processes without the need of detailed or complete image recognition and analysis. Basically, the artificial physical tag is artificially adapted to provide a signature in any region of the electromagnetic spectrum different from any spectral property of the materials in nature.

In the present disclosure, the terms "imaging" refers to remote sensing imaging technology, including spectral (multispectral, hyperspectral, ultraspectral), Synthetic Aperture Radar (SAR), Raman and Lidar among other active and passive technologies.

In some examples, the signature provided by the artificial physical tag may uniquely identify the target. As described above, a target may be tagged with a physical tag artificially manipulated in order to provide a signature different from any other signature in the nature or artificially created.

Furthermore, associating the artificial physical tag to the target may comprise:
Physically associating the artificial physical tag to the target; and/or
Modifying the original signature provided by a material comprised in the target; and/or
Using the original signature provided by a material comprised in the target; and/or
Using a natural signature artificially associated to the target.

This way, for example, the artificial physical tag may be on the target (i.e. a specific coating or sticker), embedded in the material of the target or the material itself.

Consequently, the tag may be, for example, an invisible paint that has properties in any region of the electromagnetic spectrum (e.g. in the infrared wavelength range) so that it has a specific spectral signature at certain wavelengths. The tagging material may be composed, for example, of a Near Infra Red (NIR) emission selective coating (i.e. at 870 nm) and it is invisible in the visible spectrum of the light.

On the other hand, a target may be tagged with two or more differently encoded taggants such as micro-particles from one batch having indicia identifying, for example, the manufacturer of the target and another batch with indicia identifying, for example, individuals units of production.

Other examples include the monitoring of crops by tagging of species, that is, by genetic manipulation of proprietary species of strains. The signature is created artificially by genetic manipulation.

The signature may also be created by a combination of natural signatures that do not exist in the nature or the signature may be a special shape or geometry.

Furthermore, the artificial physical tag may not be intentionally associated to the target but its original properties allow its use for the present invention.

In any case, the signature may change in time according to the properties of, for example, the medium, applied voltage or other influencing factors.

The artificial physical tag may provide information when it is not present in the target, that is, by its absence.

In some examples, the signature may be a spectral signature in the solar-reflective region as a function of wavelength. In other spectral regions, the signature of interest may use properties of the artificial physical tag like temperature and emissivity (i.e. TIR), surface roughness and dielectricity (i.e. radar and microwave), polarization, phase data or specific reemitted energy (i.e. LIDAR, Raman, Fluorescence LIDAR, SAR, etc.) or a combination of two or more of said disclosed properties.

Basically, the signature may be an electromagnetic radiation and more specifically a specific combination of emitted, reflected, scattered and/or absorbed electromagnetic radiation.

According to some examples, the signature may derive from physical characteristics of the tag and not from physical characteristics of the target. This way, the signature may provide information or data based on characteristics of the tag (wavelength, roughness, temperature, etc.) and not information or data related to the target as occurs, for example, in RFID technology.

According to another aspect, a method of obtaining data from acquired imagery and/or data related to at least one target is disclosed. The imagery and/or data may be acquired in any region of the electromagnetic spectrum. The target may comprise at least one artificial physical tag configured to provide a signature of interest for imaging technology in any region of the electromagnetic spectrum. The method may comprise processing the acquired imagery and/or data related to the target.

In this scenario, acquiring imagery and/or data may be programmed in a periodic way and scan certain areas of the earth with a certain revisit time. Once the imagery and/or data are acquired, it may be processed for obtaining data related to the target. Said obtained data may be part of a searchable group of data by means of a search engine, for example, for finding the target or data related to the target.

Processing the acquired imagery and/or data, in the present scenario, may be performed at the same location as acquisition. For example, if the imagery and/or data acquisition system is a satellite, processing of the acquired imagery and/or data may be performed at the same satellite.

At this point it should be noted that acquiring imagery and/or data may be done with no distance limitations in the range of hundreds of meters in contrast to the RFID technology that has important constraints in distances bigger than two hundred meters as it is usually performed on electromagnetic fields and imagery is usually performed on propagated signals.

On the other hand, acquired imagery and/or data may be treated as image or data or a combination of both. There are two different ways of representing and displaying remote sensing data, either pictorially or digitally, and both are interchangeable as they convey the same information.

In some examples, the method may further comprise receiving the acquired imagery and/or data related to the target. In this scenario, because a reception of the acquired imagery and/or data is performed, processing of said received acquired imagery and/or data may be done in a different location to the acquisition. Thus, for example, if the imagery and/or data acquisition system is a satellite, processing the acquired imagery and/or data may be performed in a ground station.

In another scenario, the reception of the acquired imagery and/or data may be in streaming or similar so that as imagery and/or data is acquired are sent, for example in real time, for processing.

Furthermore, the method may comprise generating a virtual tag corresponding to the artificial physical tag or a portion of said tag. This way, the physical tag may be virtualized so that the target may be searchable in databases enabling the optimized search of physical objects and the creation of physical target signature search engines therefore as will be described later.

Processing the acquired imagery and/or data related to the target may comprise detecting the generated virtual tag or a portion of said tag in the acquired imagery and/or data.

In terms of processing, some pre-processing could be added to the acquisition step previously to the proper imagery and/or data processing step, including a minimum number of pixels to be considered as a sample to be relevant, that is, a minimum of, for example, two consecutive pixels showing the signature of interest to be considered a valid tag.

In some examples, the method may further comprise:
Relating the generated virtual tag to at least one of the following:
The artificial physical tag or a portion of said tag;
The signature provided by the artificial physical tag;
A combination of them.

According to some examples, processing the acquired imagery and/or data related to the target may comprise obtaining metadata based on the previously disclosed detection of the generated virtual tag.

Then, the virtual tag (or the physical tag or a portion of it) may be related with the obtained metadata like geopositioning of the target, time data to which the imagery and/or data are acquired and target descriptors (e.g. name, owner, etc.). More specifically, this association may be done using the physical tag, its signature of interest, the virtual tag, or a combination of them The tag virtualization and link with metadata may be done in different or several steps of the method, for example, during imagery and/or data processing or during imagery and/or data acquisition.

In some examples, the method may further comprise:
Indexing a plurality of data based on at least one of the following obtained data:
The obtained metadata related to the target;
The generated virtual tag;
The artificial physical tag of the target;
The signature provided by the artificial physical tag.

Thus, once the virtual tag is identified in the acquired imagery and/or data it is possible the use of indexing techniques and, consequently, the creation of a searchable group of data.

According to some examples, the method may comprise tagging the target with the artificial physical tag configured to provide a signature of interest for imaging technology in any region of the electromagnetic spectrum by the execution of a method of tagging at least one target with an artificial physical tag configured to provide a signature of interest for imaging technology in any region of the electromagnetic spectrum, said method having been described above.

In another aspect, a computer program is disclosed. The computer program product may comprise program instructions for causing a computer system to perform a method of obtaining data from acquired imagery and/or data related to at least one target according to some examples disclosed above. Said computer system may be a part of an imagery and/or data acquisition system (for example, a satellite or a satellite constellation) or the imagery and/or data acquisition system itself or may be a system arranged in a different location to the imagery and/or data acquisition system.

The computer program product may be embodied on a storage medium (for example, a CD-ROM, a DVD, a USB drive, on a computer memory or on a read-only memory) or carried on a carrier signal (for example, on an electrical or optical carrier signal).

In another aspect, a system for obtaining data from acquired imagery and/or data related to at least one target is disclosed. The imagery and/or data may be acquired in any region of the electromagnetic spectrum. The target may comprise at least one artificial physical tag configured to provide a signature of interest for imaging technology in any region of the electromagnetic spectrum. The system may comprise means for processing the acquired imagery and/or data related to the target.

Basically, this system must be able to reproduce the method described above through electronic/computing means. Said electronic/computing means may be used interchangeably, that is, a part of the described means may be electronic means and the other part may be computing means, or all described means may be electronic means or all described means may be computing means.

According to another aspect, a system for obtaining data from imagery and/or data related to at least one target is disclosed. The imagery and/or data may be acquired in any region of the electromagnetic spectrum. The target may comprise at least one artificial physical tag configured to provide a signature of interest for imaging technology in any region of the electromagnetic spectrum. The system may be configured to process the acquired imagery and/or data related to the target.

In another aspect, a computer system is disclosed. The computer system may comprise a memory and a processor, embodying instructions stored in the memory and executable by the processor, the instructions comprising functionality to execute a method of obtaining data from acquired imagery and/or data related to at least one target according to some examples disclosed herein. Therefore, said computer system must be able to reproduce the method described above by means of instructions executed by the processor.

In some examples, the signature provided by the artificial physical tag may identify uniquely the target. Furthermore, the signature may be a spectral signature and/or may use at least one of the following properties of the artificial physical tag:

Temperature;
Emissivity;
Surface roughness;
Dielectricity;
Polarization;
Phase data;
Specific reemitted energy;
A combination of at least two of said properties.

According to some examples, the signature may derive from physical characteristics of the tag.

In some examples, the system may be selected from the following:

A space or aerospace device;
A satellite or a satellite constellation;
A drone or a group of drones;
A plane or a group of planes;
At least one ground camera;
A plurality of data or database.

According to yet another aspect, a method of remote sensing of at least one target is disclosed. Said target may comprise at least one artificial physical tag configured to provide a signature of interest for imaging technology in any region of the electromagnetic spectrum. The method may comprise:

Identifying the signature of the target provided by the artificial physical tag;
Acquiring imagery and/or data related to the target of the identified signature in any region of the electromagnetic spectrum.

Imagery and/or data acquisition may be performed in different ways depending on the temporal and spatial resolution needed. In this scenario, the acquisition of imagery and/or data may be programmed ad hoc for certain purposes, including a temporal range and spatial region like a Polygon of Interest (POI). Said purposes may be, for example, locating a target. In any case, when the signature of the desired target is identified, imagery and/or data related to the target may be acquired.

In some examples, the method may comprise providing energy to the artificial physical tag of the target, wherein identifying the signature of the target may depend on the properties of both the artificial physical tag of the target and the provided energy.

In another aspect, a computer program is disclosed. The computer program product may comprise program instructions for causing a computer system to perform a method of remote sensing of at least one target according to some examples disclosed above. Said computer system may be a part of an imagery and/or data acquisition system (for example, a satellite or a satellite constellation) or the imagery and/or data acquisition system itself.

The computer program product may be embodied on a storage medium (for example, a CD-ROM, a DVD, a USB drive, on a computer memory or on a read-only memory) or carried on a carrier signal (for example, on an electrical or optical carrier signal).

In another aspect, a system for remote sensing of at least one target is disclosed. Said target may comprise at least one artificial physical tag configured to provide a signature of interest for imaging technology in any region of the electromagnetic spectrum. The system may comprise:

Means for identifying the signature of the target provided by the artificial physical tag;
Means for acquiring imagery and/or data related to the target of the identified signature in any region of the electromagnetic spectrum.

Basically, this system must be able to reproduce the method described above through electronic/computing means. Said electronic/computing means may be used interchangeably, that is, a part of the described means may be electronic means and the other part may be computing means, or all described means may be electronic means or all described means may be computing means.

According to another aspect, a system for remote sensing of at least one target is disclosed. Said target may comprise at least one artificial physical tag configured to provide a signature of interest for imaging technology in any region of the electromagnetic spectrum. The system may be configured to:

Identify the signature of the target provided by the artificial physical tag;
Acquire imagery and/or data related to the target of the identified signature in any region of the electromagnetic spectrum.

In another aspect, a computer system is disclosed. The computer system may comprise a memory and a processor, embodying instructions stored in the memory and executable by the processor, the instructions comprising functionality to execute a method of remote sensing of at least one target according to some examples disclosed herein. Therefore, said computer system must be able to reproduce the method described above by means of instructions executed by the processor.

In some examples, the signature provided by the artificial physical tag uniquely may identify the target. Furthermore, the signature may be a spectral signature and/or may use at least one of the following properties of the artificial physical tag:

Temperature;
Emissivity;
Surface roughness;
Dielectricity;
Polarization;
Phase data;
Specific reemitted energy;
A combination of at least two of said properties.

According to some examples, the signature may derive from physical characteristics of the tag.

In some examples, the system may be an imagery and/or data acquisition system selected from the following:

A space or aerospace device;
A satellite or a satellite constellation;
A drone or a group of drones;
A plane or a group of planes;
At least one ground camera;
A plurality of data or database.

This way, acquiring imagery and/or data related to the target may be performed by any of the disclosed imagery and/or data acquisition systems. On the other hand, the acquisition of imagery and/or data may be performed by acquiring imagery and/or data from groups of data, repositories, databases or similar.

According to yet another aspect, a method of obtaining data from imagery and/or data related to at least one target is disclosed. The imagery and/or data may be acquired by the execution of a method of remote sensing of at least one target as described above. The target may comprise at least one artificial physical tag configured to provide a signature of interest for imaging technology in any region of the electromagnetic spectrum. The method may comprise processing the acquired imagery and/or data related to the target.

In this scenario, the acquisition of imagery and/or data may be programmed ad hoc for certain purposes, including a temporal range and spatial region like a Polygon of Interest (POI). Said purposes may be, for example, locating a target. In any case, when the signature of the desired target is identified, imagery and/or data related to the target may be acquired. Once the imagery and/or data are acquired, it may be processed for obtaining data related to the target. Said obtained data may be part of a searchable group of data by means of a search engine, for example, for finding the target or data related to the target.

Processing the acquired imagery and/or data, in the present scenario, may be performed at the same location as acquisition. For example, if the imagery and/or data acquisition system is a satellite, processing of the acquired imagery and/or data may be performed at the same satellite.

At this point it should be noted that acquiring imagery and/or data may be done with no distance limitations in the range of hundreds of meters in contrast to the RFID technology that has important constraints in distances bigger than two hundred meters as it is usually performed on electromagnetic fields and imagery is usually performed on propagated signals.

On the other hand, acquired imagery and/or data may be treated as image or data or a combination of both. There are two different ways of representing and displaying remote sensing data, either pictorially or digitally, and both are interchangeable as they convey the same information.

In some examples, the method may further comprise receiving the acquired imagery and/or data related to the target. In this scenario, because a reception of the acquired imagery and/or data is performed, processing of said received acquired imagery and/or data may be done in a different location to the acquisition. Thus, for example, if the imagery and/or data acquisition system is a satellite, processing the acquired imagery and/or data may be performed in a ground station.

In another scenario, the reception of the acquired imagery and/or data may be in streaming or similar so that as imagery and/or data is acquired are sent, for example in real time, for processing.

Furthermore, the method may comprise generating a virtual tag corresponding to the artificial physical tag or a portion of said tag. This way, the physical tag may be virtualized so that the target may be searchable in databases enabling the optimized search of physical objects and the creation of physical target signature search engines therefore as will be described later.

Processing the acquired imagery and/or data related to the target may comprise detecting the generated virtual tag or a portion of said tag in the acquired imagery and/or data.

In terms of processing, some pre-processing could be added to the acquisition step previously to the proper imagery and/or data processing step, including a minimum number of pixels to be considered as a sample to be relevant, that is, a minimum of, for example, two consecutive pixels showing the signature of interest to be considered a valid tag.

In some examples, the method may further comprise:
Relating the generated virtual tag to at least one of the following:
The artificial physical tag or a portion of said tag;
The signature provided by the artificial physical tag;
A combination of them.

According to some examples, processing the acquired imagery and/or data related to the target may comprise obtaining metadata based on the detection of the generated virtual tag as described above.

Then, the virtual tag or a portion of it (or the physical tag or a portion of it) may be related with the obtained metadata like geopositioning of the target, time data to which the imagery and/or data are acquired and target descriptors (e.g. name, owner, etc.). More specifically, this association may be done using the physical tag, its signature of interest, the virtual tag, or a combination of them.

The tag virtualization and link with metadata may be done in different or several steps of the method, for example, during imagery and/or data processing or during imagery and/or data acquisition.

In some examples, the method may further comprise:
Indexing a plurality of data based on at least one of the following obtained data:
The obtained metadata related to the target;
The generated virtual tag;
The artificial physical tag of the target;
The signature provided by the artificial physical tag.

Thus, once the virtual tag is identified in the acquired imagery and/or data it is possible the use of indexing techniques and, consequently, the creation of a searchable group of data.

According to some examples, the method may comprise tagging the target with the artificial physical tag configured to provide a signature of interest for imaging technology in any region of the electromagnetic spectrum by the execution of a method of tagging at least one target with an artificial physical tag configured to provide a signature of interest for imaging technology in any region of the electromagnetic spectrum, said method having been described above.

In another aspect, a computer program is disclosed. Said computer program may comprise program instructions for causing a computer system to perform a method of obtaining data from imagery and/or data related to at least one target as described above.

The computer program product may be embodied on a storage medium (for example, a CD-ROM, a DVD, a USB drive, on a computer memory or on a read-only memory) or carried on a carrier signal (for example, on an electrical or optical carrier signal).

According to yet another aspect, a system for obtaining data from imagery and/or data related to at least one target is disclosed. The imagery and/or data may be acquired by the execution of a method of remote sensing of at least one target as described above. The target may comprise at least one artificial physical tag configured to provide a signature of interest for imaging technology in any region of the electromagnetic spectrum. The system may comprise means for processing the acquired imagery and/or data related to the target.

Basically, this system must be able to reproduce the method described above through electronic/computing means. Said electronic/computing means may be used interchangeably, that is, a part of the described means may be electronic means and the other part may be computing means, or all described means may be electronic means or all described means may be computing means.

In another aspect, a system for obtaining data from imagery and/or data related to at least one target is disclosed. The imagery and/or data may be acquired by the execution of a method of remote sensing of at least one target as described above. The target may comprise at least one artificial physical tag configured to provide a signature of interest for imaging technology in any region of the electromagnetic spectrum. The system may be configured to process the acquired imagery and/or data related to the target.

In another aspect, a computer system is disclosed. The computer system may comprise a memory and a processor, embodying instructions stored in the memory and executable by the processor, the instructions comprising functionality to execute a method of obtaining data from imagery and/or data related to at least one target according to some examples disclosed herein. Therefore, said computer system must be able to reproduce the method described above by means of instructions executed by the processor.

In some examples, the signature provided by the artificial physical tag may uniquely identify the target. Furthermore, the signature may be a spectral signature and/or may use at least one of the following properties of the artificial physical tag:
  Temperature;
  Emissivity;
  Surface roughness;
  Dielectricity;
  Polarization;
  Phase data;
  Specific reemitted energy;
  A combination of at least two of said properties.

According to some examples, the signature may derive from physical characteristics of the tag.

In some examples, the system may be a system selected from the following:
  A space or aerospace device;
  A satellite or a satellite constellation;
  A drone or a group of drones;
  A plane or a group of planes;
  At least one ground camera;
  A plurality of data or database.

In another aspect, a method of finding at least one target or data related to the target from at least data obtained by the execution of a method of obtaining data from imagery and/or data related to at least one target as described above is disclosed. The method may comprise:
  Receiving a query based on one or more data that may be related to the target or not;
  Returning data comprised in at least the obtained data.

This way, the method, given a query on one or more data in, for example, any Boolean combination of data, may return at least one of the following data, different from data in the query:
  Time to which the imagery and/or data are acquired;
  Location data of the target;
  Signature of interest provided by the artificial physical tag;
  Virtual tag;
  Metadata;
  Target descriptors.

On the other hand, it is possible to perform a search in real time, that is, given a query, it is possible to find a target or obtain data related to the target in real time.

For example, if a user wants or wishes to locate his car (previously tagged with a artificial physical tag), for example because the car has been stolen, the user may propose a query with data related to his car for finding it in real time.

The query may comprise data from the obtained data (e.g. said data may be stored in a repository of data) and/or data from other sources (e.g. another repository of data), such as repositories or databases. In the same way, the returned data may comprise data from the obtained data and/or data from other sources. In any case, data in the queries or data returned taking into account the queries may be related to the target.

At this point it is important to highlight that the obtained data may be stored in a repository with other data related to the target.

Results may be presented in different formats such as data, results lists or visual representation.

In another aspect, a computer program is disclosed. The computer program may comprise program instructions for causing a computer system to perform a method of finding at least one target as described above.

The computer program product may be embodied on a storage medium (for example, a CD-ROM, a DVD, a USB drive, on a computer memory or on a read-only memory) or carried on a carrier signal (for example, on an electrical or optical carrier signal).

It should be noted that the computer program may be a search engine.

According to another aspect, a system for finding at least one target from at least data obtained by the execution of a method of obtaining data from imagery and/or data related to at least one target as described above is disclosed. The system may comprise:
  Means for receiving a query based on one or more data related or not to the target;
  Means for returning data comprised in at least the obtained data.

Basically, this system must be able to reproduce the method described above through electronic/computing means. Said electronic/computing means may be used interchangeably, that is, a part of the described means may be electronic means and the other part may be computing means, or all described means may be electronic means or all described means may be computing means.

According to yet another aspect, a system for finding at least one target from at least data obtained by the execution of a method of obtaining data from imagery and/or data related to at least one target as described above is disclosed. The system may be configured to:
  Receive a query based on one or more data related or not to the target;
  Return data comprised in at least the obtained data.

In another aspect, a computer system is disclosed. The computer system may comprise a memory and a processor, embodying instructions stored in the memory and executable by the processor, the instructions comprising functionality to execute a method of finding at least one target as described above.

Additional objects, advantages and features of embodiments of the invention will become apparent to those skilled in the art upon examination of the description, or may be learned by practice of the invention.

BRIEF DESCRIPTION OF THE DRAWINGS

Non-limiting examples of the present disclosure will be described in the following, with reference to the appended drawings, in which.

DETAILED DESCRIPTION OF EMBODIMENTS

Remote sensing may be understood as a process of acquiring imagery and/or data about terrestrial features and/or targets without actually being in contact with them.

Thus, for remote sensing, it is possible to define a target (e.g. a person or a group of persons, things, etc.) to be sensed. Each target may be tagged with at least one artificial physical tag configured to provide a signature of interest for imagery data interpretation.

In some examples, the artificial physical tag may be any element comprised in the target. In this case, tagging the target may be not required. For example, the object may be coated with paint or any material with determined properties that allows using it as an artificial physical tag, that is, the original properties of the paint or the material allow its use as an artificial physical tag.

On the other hand, the artificial physical tag may be on the target itself (for example, a specific coating or a sticker), embedded in the material forming part of the target or the material itself.

The artificial physical tag may be a special shape or geometry physically assigned to the target. Furthermore, said tag may be created artificially by genetic manipulation or other artificial means or as a combination of natural signatures that does not exist in nature.

In some examples, a target may be tagged with two or more differently encoded taggants, such as microparticles or nanoparticles from one batch having indicia identifying, for example, the manufacturer and from another batch with indicia identifying, for example, individual units of production. Alternative examples may comprise the monitoring of crops by tagging of species, that is, by genetic manipulation of proprietary species or strains.

Furthermore, the artificial physical tag may provide information or data when it is not present in the target, that is, by its absence.

This way, the execution of a method of tagging the target with an artificial physical tag configured to provide a signature of interest for imaging technology in any region of the electromagnetic spectrum may be required. Said method may comprise a step of associating the artificial physical tag to the target.

The artificial physical tag may be associated to the target in different ways. For example, Physically associating the artificial physical tag to the target; and/or Modifying the original signature provided by a material comprised in the target; and/or Using the original signature provided by a material comprised in the target; and/or Using a natural signature artificially associated to the target.

At this point it is important to highlight that the term "imaging" refers to remote sensing imaging technology, including spectral (multispectral, hyperspectral, ultraspectral) Synthetic Aperture Radar (SAR) and Lidar among other active and passive technologies.

The signature provided by the artificial physical tag may be an electromagnetic radiation that may uniquely identifies the target, being a specific combination of emitted, reflected, scattered and/or absorbed electromagnetic radiation. The signature of interest, in the solar-reflective region, may be a spectral signature as a function of wavelength. In other spectral regions, signatures of interest may use properties like temperature (or spectral properties in general) and emissivity (i.e. TIR—Thermal Infrared Remote sensing), surface roughness and dielectricity (i.e. radar and microwave), polarization, phase data or specific reemitted energy (i.e. LADAR—LAser Detection And Ranging, Raman, Fluorescence LIDAR—Light Detection and Ranging or Laser Imaging Detection and Ranging, SAR—Synthetic Aperture Radar, etc.) or combinations of them.

The signature may change in time according to the properties of the medium, applied voltage or other influencing factors.

Furthermore, the signature may be easily recognized by automated or semi-automated processes without the need of detailed or complete image recognition and analysis.

Figure 1:
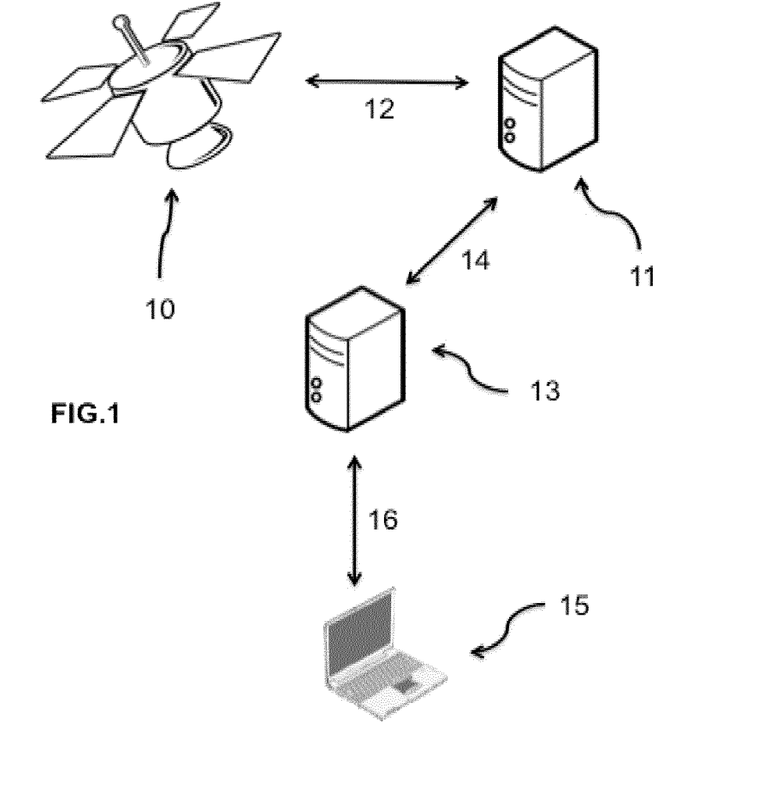
FIG. 1 illustrates a schematic diagram of the operation of the invention according to some examples.

According to some examples, the target may be formed by a motor vehicle fleet, which is distributed across an area or Polygon of Interest (POI), for example "California". As described above, the target (that is, the motor vehicles of the fleet) may be tagged with a signature of interest (an artificial physical tag). In said examples, the artificial physical tag may be a marking paint such as an invisible paint, which has properties in the infrared wavelength range so that it has a specific spectral signature at certain wavelengths. Thus, the tagging material (i.e. the marking paint) may be composed, for example, of a Near Infra Red (NIR) emission selective coating (i.e. at 870 nm) and it is invisible in the visible spectrum of the light. As can be seen in FIG. 1, once the target is tagged with an artificial physical tag, a method of remote sensing of the target for acquiring imagery and/or data related to the target may be required.

Imagery and/or data acquisition may be performed in different ways depending on the temporal and spatial resolution needed. For example, the acquisition may be programmed ad hoc for certain purposes, including a temporal range and spatial region like a POI (Polygon of Interest). Alternatively, the acquisition of the imagery and/or data may be programmed in a periodic way and scan certain areas of the terrestrial surface with a certain revisit time. Another imagery and/or data acquisition configuration may use streaming data from different sensors and databases obtaining a real time imagery and/or data.

In terms of its spectral/radiometric resolution, the acquisition step may be classified as well as a custom band-filtered acquisition (ad hoc for certain purposes and wavelength bands) or a routine multiband acquisition.

Basically, the method may comprise:

Identifying the signature of the target provided by the artificial physical tag;

Acquiring imagery and/or data related to the target of the identified signature in any region of the electromagnetic spectrum.

The acquisition may be programmed ad hoc for certain purposes. Returning to the example, the acquisition may be programmed for detecting or identifying the vehicles of the fleet in a POI (it may be all the terrestrial surface). This way, when a imagery and/or data acquisition system 10 (as can be seen in FIG. 1) identifies at least one of the vehicles of the fleet, the cubesat constellation (i.e. the imagery and/or data acquisition system 10 in the examples), through its corresponding sensors sensitive to the wavelength of the tagging in the NIR, acquires imagery and/or data related to said at least identified vehicle.

Thus, the disclosed method may be basically required in an ad hoc programming or in a streaming programming. The periodic way programming will be described later.

In some examples, the imagery and/or data acquisition system 10 may be, for example, a satellite or a satellite constellation and/or any other remote sensing system like a drone or a group of drones, a plane or a group of planes, a ground camera or a plurality of cameras, a plurality of data or a database, etc. In the last case, acquiring imagery and/or data may be performed obtaining imagery and/or data from a plurality of data or repository (e.g. a database).

The terms "system", "computing system" or "computer system" in the present disclosure refer to a system of one or more interconnected computers. Each computer connected to the system can operate independently, but has the ability to communicate with other computers or peripherals connected to the system or not.

Basically, the imagery and/or data acquisition system 10 used in the present examples may be capable of obtaining imagery and/or data directly from the target with no distance limitations in the range of hundreds of meters in contrast to other known systems with distance limitations such as RFID that has important constraints in distances bigger than two hundred meters as it is usually performed on electromagnetic fields and imagery is usually performed on propagated signals.

More specifically, the electromagnetic radiation (that is, the signature) emitted or provided by the artificial physical tag of the target may be detected or received by at least one remote sensing device (not shown) comprised in the imagery and/or data acquisition system 10.

Remote sensing devices comprised or associated to the imagery and/or data acquisition system 10 are used to collect large volumes of data as events are taking place. Infrastructure platforms vary and it may be possible to include a middleware layer to integrate data collected by the remote sensing devices with data in a data warehouse or other data sources like the Internet. The use of external sources like mapping databases and sensors coming form other locations as well as geographical information is extended.

According to some examples, the remote sensing device (or the imagery and/or data acquisition system 10 itself) may comprise an energy source (e.g. a source of electromagnetic radiation) that illuminates or provides energy to the artificial physical tag of the target so that the tag emits the signature as a response to the provided energy. Basically, an interaction between the incident radiation (i.e. the energy generated by the energy source) and the artificial physical tag of the target is induced depending on the properties of both the artificial physical tag and the radiation.

When the energy has been scattered, reflected and/or absorbed by, or emitted from the artificial physical tag, the remote sensing device may collect and record the electromagnetic radiation (that is, the energy) of the signature, that is, imagery and/or data from the target may be acquired.

The acquisition, depending on the type of the remote sensing device, may be recorded in the format of images (imagery) and/or as an array of numbers in digital format (data), that is, there are two different ways of representing and displaying the recorded imagery and/or data, pictorially or digitally. Furthermore, the imagery and/or data may be treated as a combination of both.

At this point it is important to highlight that the term "imagery" may include colour or black and white photographs, infra-red photographs and video, radar screens and/or synthetic aperture radar formats, ultrasound and others. In short, any type of sensor-related data projected in 2D and/or 3D formats or not.

This way, returning to the previous examples, the identification of the target (i.e. its signature) may be carried out, for example, by the vehicle fleet owners (for example "GM"). The tagging is made by applying the marking paint to all vehicles produced by "GM" of one specific model in a production batch called "Model Year 2015" (MY2015). If possible, in the present examples, the target may be tagged in a surface pointing upwards, such as the hood, for example, the roof or the trunk lid.

The vehicles of the fleet provided with the marking paint as an artificial physical tag may be detected by, for example, a cubesat constellation, which sensors may be sensitive to the wavelength of the tagging in the NIR, with the following features:

a spatial resolution of less than 1 meter;

a spectral resolution of 10 nm.

Figure 2:
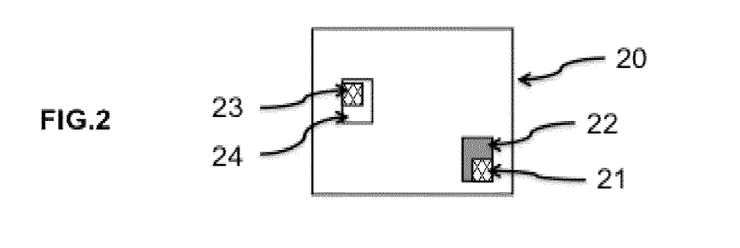
FIG. 2 illustrates a schematic diagram of acquired imagery and/or data showing artificial physical tags and targets.
Figure 3:
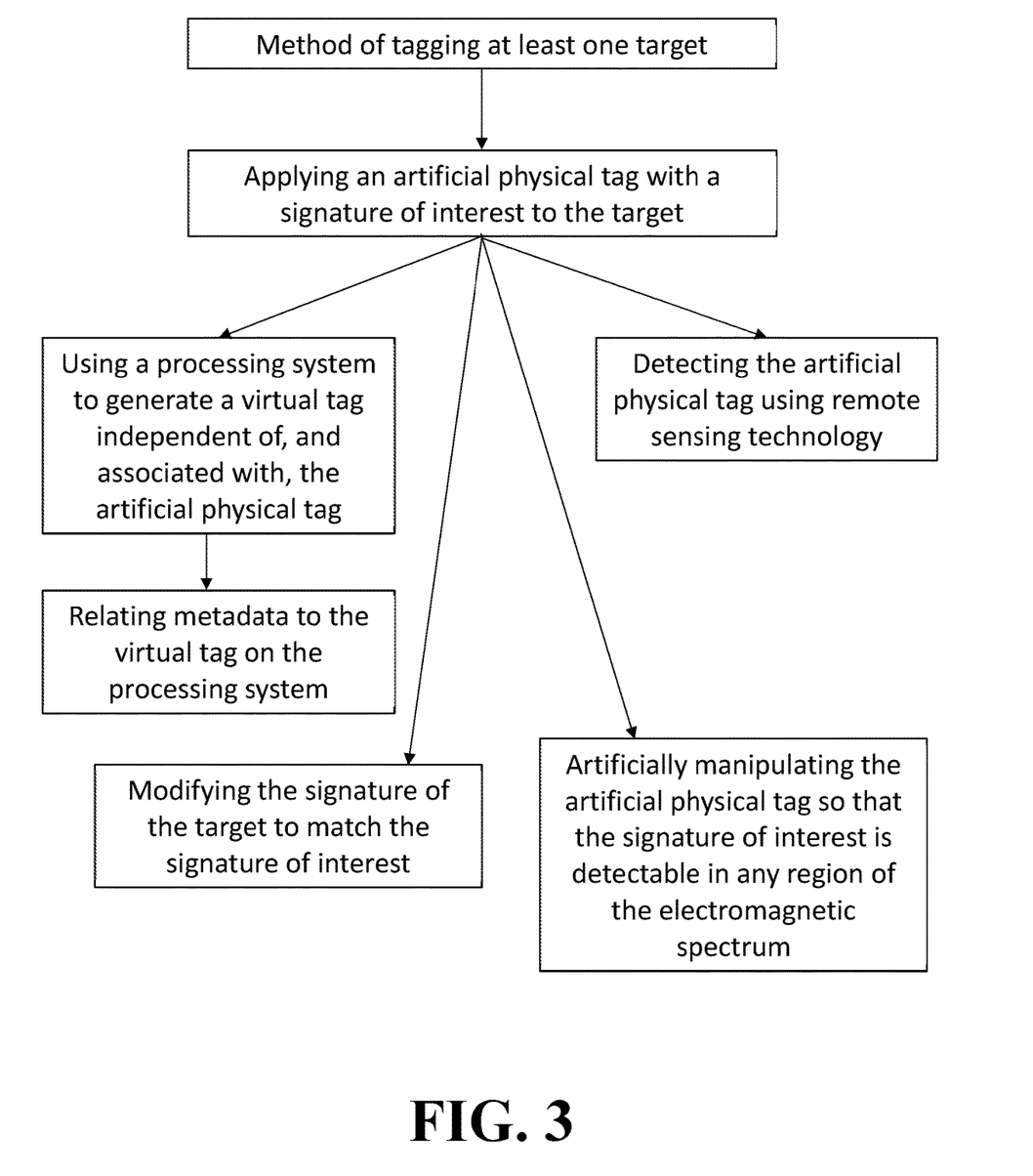
FIG. 3 illustrates a method of tagging at least one target, according to at least one embodiment of the present disclosure.
Figure 4:
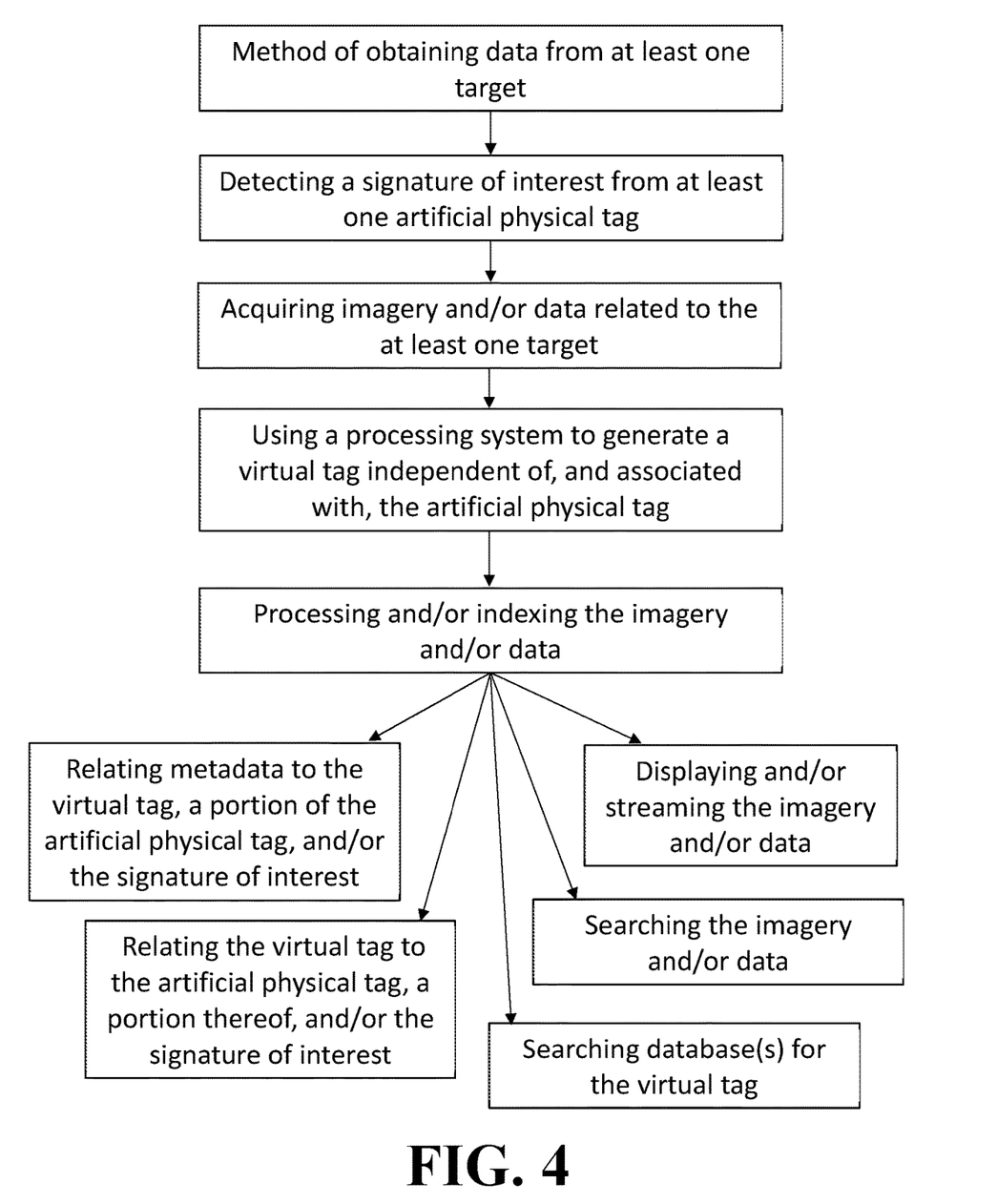
FIG. 4 illustrates a method of obtaining data from at least one target, according to at least one embodiment of the present disclosure.
Figure 5:
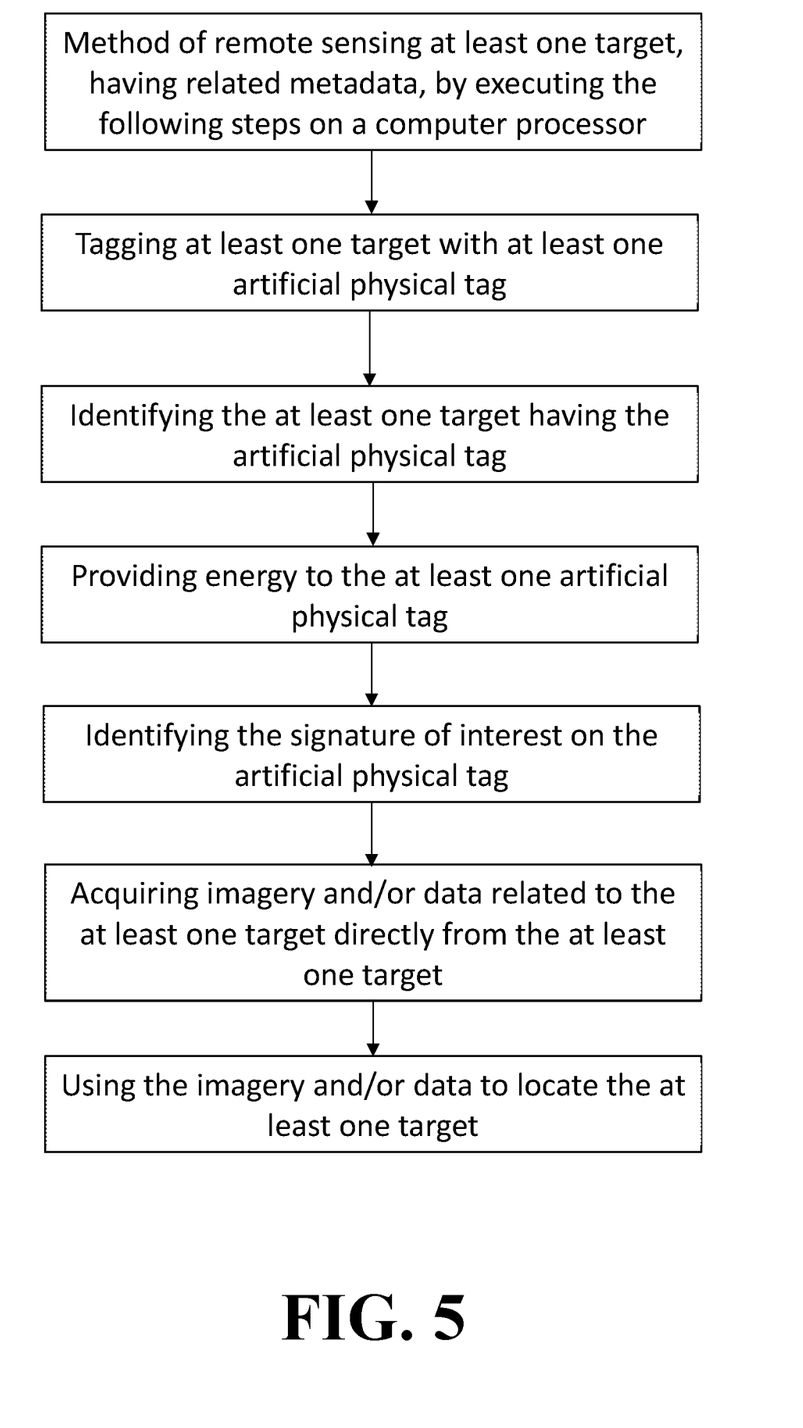
FIG. 5 illustrates a method of remote sensing of at least one target, according to at least one embodiment of the present disclosure.
Figure 6:
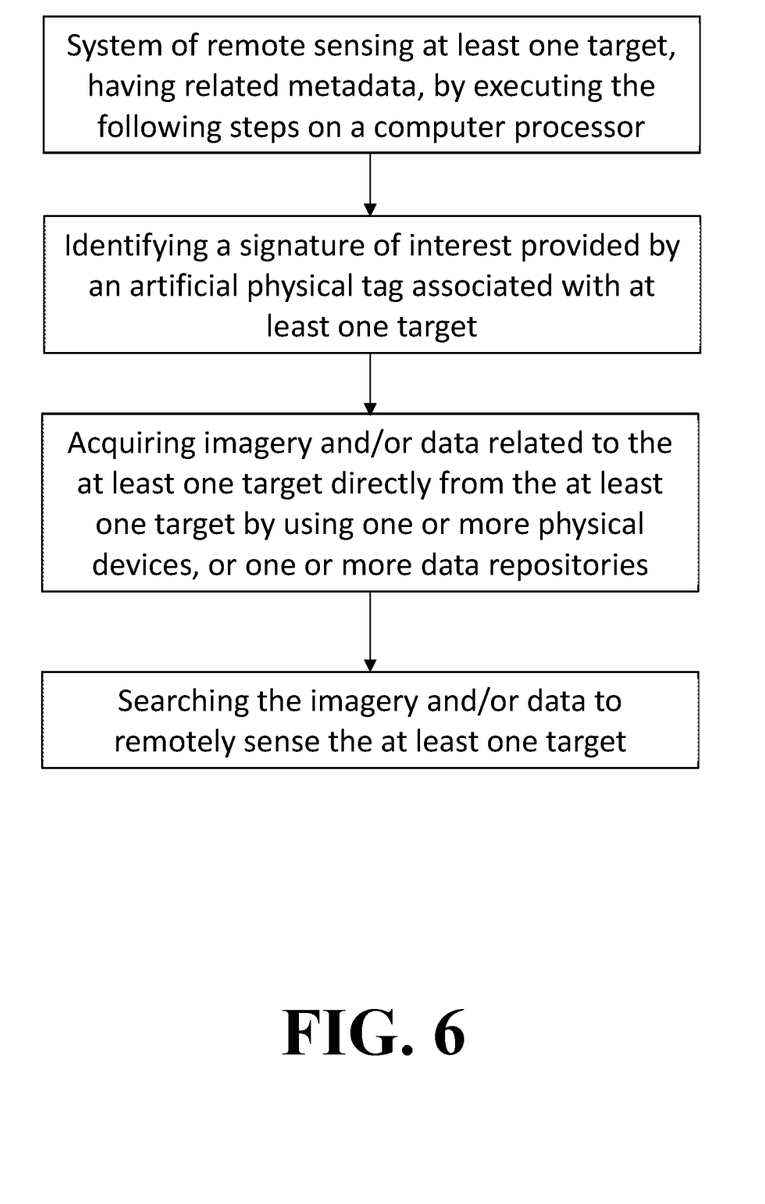
FIG. 6 illustrates a system of remote sensing of at least one target, according to at least one embodiment of the present disclosure.

An example of acquired imagery and/or data 20 is shown in FIG. 2. In said figure, the imagery and/or data acquisition system 10 has identified two objects 22,24 (for example, things or persons) of a target, each object 22; 24 comprising the artificial physical tag 21; 23 to be identified respectively.

The imagery and/or data acquisition system 10 (or a sub-system comprised or associated to the imagery and/or data acquisition system) configured to execute the disclosed method of remote sensing may be implemented by computer means, electronic means or a combination of them (i.e. said electronic/computer means may be used interchangeably, that is, a part of the means may be electronic means and the other part may be computer means, or all means may be electronic means or all means may be computer means).

An example of a system comprising only computer means may be a computer system, which may comprise a memory and a processor, the memory being adapted to store a series of computer program instructions, and the processor being adapted to execute these instructions stored in the memory in order to generate the various events and actions for which the system has been programmed.

Said computer program instructions (which results in a computer program) may cause the system to perform the method. The computer program instructions (that is, the computer program) may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the method. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant method.

Examples of a system comprising only electronic means (that is, a purely electronic configuration) may be a programmable electronic device such as a CPLD (Complex Programmable Logic Device), an FPGA (Field Programmable Gate Array) or an ASIC (Application-Specific Integrated Circuit).

In case the system is a combination of electronic and computer means, the computer means may be a set of computer program instructions and the electronic means may be any electronic circuit capable of implementing the corresponding step or steps of the cited method.

Once the imagery and/or data are acquired, said acquired imagery and/or data may be processed (the object of the processing is to obtain data related to the target). In this case, two scenarios are possible.

At this point it should be remembered that imagery and/or data acquisition may be performed in different ways depending on the temporal and spatial resolution needed. For example, the acquisition may be programmed ad hoc for certain purposes, including a temporal range and spatial region like a POI (Polygon of Interest). Alternatively, the acquisition of the imagery and/or data may be programmed in a periodic way and scan certain areas of the terrestrial surface with a certain revisit time. Another imagery data acquisition configuration may use streaming data from different sensors and databases obtaining a real time imagery and/or data. In any case, once the imagery and/or data related to the target is acquired, the processing of said acquired imagery and/or data may be the same independently of the used acquisition programming.

In a first scenario, said acquired imagery and/or data may be processed in the imagery and/or data acquisition system 10 (e.g. the cubesat constellation) itself by a processing system 11 comprised in it.

In a second scenario, the acquired imagery and/or data may be processed in a remote location, for example, in a ground station comprising the processing system 11.

In said second scenario, in a periodic way acquisition or in a streaming acquisition, transmitting all the acquired imagery or data to the processing system 11 may be not required. Thus, returning to the example described above, due to the tagging material (i.e. the marking paint) is composed, for example, of a Near Infra Red (NIR) emission selective coating (i.e. at 870 nm) only the imagery or data related to said wavelength may be required for executing the step of processing the imagery and/or data. This way, using imagery or data only related to said wavelength probably will optimize the acquisition and processing resources than obtaining all acquired imagery and/or data.

Furthermore, in the second scenario, the information exchange between the imagery and/or data acquisition system 10 and the processing system 11 may be performed through a communication network 12, for example a global communication network such as the Internet. Said communication between the imagery and/or data acquisition system and the processing system may be secured by means of, for example, cryptographic keys and/or a SSL tunnel established between the acquisition system 10 and the processing system 11.

In the first scenario, the execution by the processing system 11 of a method of obtaining data from the acquired imagery and/or data is required. Basically, the method may comprise the step of processing the acquired imagery and/or data related to the target.

In terms of processing some pre-processing could be added to the acquisition phase previously to the proper data processing step, including a minimum number of pixels to be considered as a sample to be relevant, i.e., for example, a minimum of two consecutive pixels showing the signature of interest to be considered a valid tag. Image recognition pre-requisites combined with the acquisition phase or previous to the data processing step could be applied as well, i.e. capture only certain shapes or geometries.

The method may comprise generating a virtual tag corresponding to the artificial physical tag or a portion of said tag. The term "virtualization" (that is, to generate a virtual tag) as in computing science refers to the act of creating a virtual (rather than actual) version of a tag as opposite to an artificial physical tag attached to an object of a target of interest. The virtual tag offers advantages as indexability and searchability. This way, the artificial physical tag may be virtualized so that the target is searchable in databases enabling the optimized search of physical objects and the creation of physical target signature search engines therefore.

The tag virtualization may be done in different or several steps: during data processing (for example, in a periodic way programming or in a streaming programming of the acquisition) or during data acquisition (for example, in an ad hoc programming or in a streaming programming of the imagery and/or data acquisition).

In any case, once the virtual tag is generated, the method may comprise a step of relating said generated virtual tag to the artificial physical tag or a portion of the tag, to the signature provided by the tag, or a combination of both.

Step of processing the acquired imagery and/or data may comprise detecting the virtual tag or a portion of it (or the artificial physical tag or a portion of it or the signature and later relates them to the corresponding virtual tag) in the acquired imagery and/or data. As previously described, processing of the acquired imagery and/or data may be performed on images or data or a combination of both.

Once the tag or a portion of it is identified it is possible to obtain metadata related to the tag such as the location (e.g. geopositioning) of the target, the time to which the imagery and/or data is acquired, target descriptors, the POI, etc. Then, said obtained metadata may be related to, for example, the virtual tag, the artificial physical tag, the signature provided by the artificial physical tag or a combination of them.

The term metadata refers to the data that allows facilitating in the discovery of relevant information. Metadata allow resources to be found by relevant criteria, identifying resources, bringing similar resources together, distinguishing dissimilar resources and/or giving location data.

The processing system 11 (that is, a sub-system comprised or associated to the imagery and/or data acquisition system 10) configured to execute the disclosed method of obtaining data may be implemented by computer means, electronic means or a combination of them (i.e. said electronic/computer means may be used interchangeably, that is, a part of the means may be electronic means and the other part may be computer means, or all means may be electronic means or all means may be computer means).

An example of a processing system comprising only computer means may be a computer system, which may comprise a memory and a processor, the memory being adapted to store a series of computer program instructions, and the processor being adapted to execute these instructions stored in the memory in order to generate the various events and actions for which the system has been programmed.

Said computer program instructions (which results in a computer program) may cause the system to perform the method. The computer program instructions (that is, the computer program) may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the method. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant method.

Examples of a system comprising only electronic means (that is, a purely electronic configuration) may be a programmable electronic device such as a CPLD (Complex Programmable Logic Device), an FPGA (Field Programmable Gate Array) or an ASIC (Application-Specific Integrated Circuit).

In case the system is a combination of electronic and computer means, the computer means may be a set of computer program instructions and the electronic means may be any electronic circuit capable of implementing the corresponding step or steps of the cited method.

In the second scenario (i.e. the acquired imagery and/or data is processed in a processing system 11 located remote to the imagery or data acquisition system 10), the method of obtaining data is the same as described for the first scenario but comprising a previous step of receiving the acquired imagery and/or data by the processing system 11. Once they are received, the acquired imagery and/or data may be processed as it has been described above for the first scenario.

Furthermore, the processing system 11 may be configured to or may comprise means for receiving the acquired imagery and/or data related to the target. As described above, said means may be electronic means and/or computer means.

Once the method of obtaining data from acquired imagery and/or data is executed, a plurality of data (e.g. metadata, the signature, the virtual tag, the artificial physical tag, etc.) may be indexed. The indexing techniques may involve the creation of a searchable group of data.

Data processing typically organizes the data to be able to be manipulated and integrated with other data and be analysed in an optimal way. After the data processing step an organized group of data is obtained, filtering the data with the desired tag or signature of interest.

Consequently, the obtained data may be integrated in databases allowing a search engine to filter results for example by week and by tag, obtaining then a spatial representation of the vehicle fleet distribution, or a data set including coordinates of the vehicle fleet for the desired time and space coordinates.

A database system 13 may store in one or more databases (repository) the searchable group of data and/or other data related to the target and may execute a search engine. Thus, the searchable group of data may be stored in a database in one computer of the system or different parts of the searchable group of data may be stored in databases in different computers of the system. Additionally, the database system 13 may store other data related to the target or may communicate with other external devices and computers that stores said other data related to the target.

The information exchange between the database system 13 and the external devices and/or computers may be performed through a communication network (not shown), for example a global communication network such as the Internet. Said communication between the database system and the external devices and/or computers may be secured by means of, for example, cryptographic keys and/or a SSL tunnel established between the database system and the external devices and/or computers.

Alternatively, a computer of the database system 13 may only execute the search engine, the obtained data or other data related to the target being stored in other computers of the system or in external devices or computers. In the last case, the database system 13 may communicate with said external devices or computers as described above.

In a first scenario, the database system 13 may be the processing system 11 itself.

In a second scenario, the database system 13 may be arranged remote from the processing system 11 and the information exchange (i.e. the searchable group of data generated from at least the obtained data) between the database system 13 and the processing system 11 may be performed through a communication network 14, for example a global communication network such as the Internet. Said communication may be secured by means of, for example, cryptographic keys and/or a SSL tunnel established between the database system 13 and the processing system 11.

In both scenarios, when a user generates a query for finding a target or data related to the target from a computing system 15, the database system 13 may receive the query through a communication network 16 for example a global communication network such as the Internet. Said communication may be secured by means of, for example, cryptographic keys and/or a SSL tunnel established between the computing system 15 and the database system 13.

The computing system may be, for example, a smartphone, a tablet, a PDA, a laptop, a desktop computer, etc.

This way, the database system 13 executes a method of finding a target or data related to the target. Said method may comprise:

Receiving the query;

Returning data related to the target.

The query may be based on one or more data related or not to the target, said data being or not data of the searchable group of data resulting from the obtained data.

On the other hand, the returned data may be data comprised in the searchable group of data and/or other data related to the target.

For example, data in the query or data returned from the query may be:

Time to which the imagery or data are acquired;

Location data of the target;

Signature of interest provided by the artificial physical tag;

Virtual tag;

Metadata;

Target descriptors.

Returning to the examples, when the vehicle fleet owner sends a query with descriptors "GM MY2015" AND POI "California" OR POI "Washington state" AND "week 3 2015" to the database system 13 a dataset may be sent to him with the location data of the vehicles in a specific time frame (for example, week 3 of 2015) and in a POI (according to the example, California). The dataset represents the geographic GM vehicle distribution in California for MY2015 in the week 3 of 2015.

Similar searches may be performed on tags including relational searches of two or more tags conditioned to their geopositioning coordinates in time, for example two elements of two fleets with different tags are together in a specific POI in a time frame.

Similar distribution data could be obtained on other assets like containers, boats and airplanes.

Correlation with other data may be done as well in searches by descriptors integrating social media data or Internet databases.

The database system 13 configured to execute the disclosed method of finding a target or data related to the target may be implemented by computer means, electronic means or a combination of them (i.e. said electronic/computer means may be used interchangeably, that is, a part of the means may be electronic means and the other part may be computer means, or all means may be electronic means or all means may be computer means).

An example of a database system comprising only computer means may be a computer system, which may comprise a memory and a processor, the memory being adapted to store a series of computer program instructions, and the processor being adapted to execute these instructions stored in the memory in order to generate the various events and actions for which the system has been programmed.

Said computer program instructions (which results in a computer program) may cause the system to perform the method. The computer program instructions (that is, the computer program) may be embodied on a storage medium (for example, a CD-ROM, a DVD, a USB drive, on a computer memory or on a read-only memory) or carried on a carrier signal (for example, on an electrical or optical carrier signal).

The computer program may be in the form of source code, object code, a code intermediate source and object code such as in partially compiled form, or in any other form suitable for use in the implementation of the method. The carrier may be any entity or device capable of carrying the computer program.

For example, the carrier may comprise a storage medium, such as a ROM, for example a CD ROM or a semiconductor ROM, or a magnetic recording medium, for example a hard disk. Further, the carrier may be a transmissible carrier such as an electrical or optical signal, which may be conveyed via electrical or optical cable or by radio or other means.

When the computer program is embodied in a signal that may be conveyed directly by a cable or other device or means, the carrier may be constituted by such cable or other device or means.

Alternatively, the carrier may be an integrated circuit in which the computer program is embedded, the integrated circuit being adapted for performing, or for use in the performance of, the relevant method.

Basically, the computer program may be a search engine for finding targets or data related to the targets.

Examples of a database system 13 comprising only electronic means (that is, a purely electronic configuration) may be a programmable electronic device such as a CPLD (Complex Programmable Logic Device), an FPGA (Field Programmable Gate Array) or an ASIC (Application-Specific Integrated Circuit).

In case the system is a combination of electronic and computer means, the computer means may be a set of computer program instructions and the electronic means may be any electronic circuit capable of implementing the corresponding step or steps of the cited method.

Although only a number of particular embodiments and examples of the invention have been disclosed herein, it will be understood by those skilled in the art that other alternative embodiments and/or uses of the invention and obvious modifications and equivalents thereof are possible. Furthermore, the present invention covers all possible combinations of the particular embodiments described. Thus, the scope of the present invention should not be limited by particular embodiments, but should be determined only by a fair reading of the claims that follow.

This way, other examples include the use of tagging and detection techniques for urban furniture or infrastructure presence control; monitoring of movement of infrastructure or geodesic points; tracking of contaminants, controlled materials or spills; contamination alerts, recall of batches of products and other applications like monitoring of level of chemicals in crops, chloride in swimming pools or the distribution of tagged crops or animals.

Further, although the examples described with reference to the drawings comprise computer apparatus/systems and processes performed in computer apparatus/systems, the invention also extends to computer programs, particularly computer programs on or in a carrier, adapted for putting the system into practice.

The invention claimed is:

1. A method of tagging at least one target, the method comprising:

applying to at least one target a coating that is an artificial physical tag, the artificial physical tag comprising an optical signature of interest in a region of the electromagnetic spectrum;

relating metadata to a virtual tag on a processing system, wherein the virtual tag has been generated on the processing system or on a further processing system to be independent of the artificial physical tag and to be associated with the artificial physical tag, wherein the metadata comprises geopositioning data and/or data acquisition time for the at least one target;

wherein the optical signature of interest is sensed via light detection and ranging (LIDAR);

wherein the optical signature of interest comprises scattered infrared radiation; and wherein the at least one target comprises a vehicle in a fleet of vehicles.

2. The method according to claim 1, wherein the signature provided by the artificial physical tag uniquely identifies the target.

3. A method of tagging at least one target, the method comprising:

applying an artificial physical tag comprising an optical signature of interest at one or more wavelengths of the electromagnetic spectrum to at least one target;

wherein the at least one target comprises a vehicle in a fleet of vehicles; and wherein the artificial physical tag is a near-infrared reflective coating, the artificial physical tag scattering energy provided by a LIDAR sensing device to the near-infrared reflective coating, thereby resulting in the artificial physical tag emitting the optical signature of interest and in the LIDAR sensing device collecting and recording electromagnetic radiation of the optical signature of interest, leading to acquisition of imagery and/or data from the at least one target;

the artificial physical tag enabling, by programming running on a processing system, the generation of a virtual tag independent of the artificial physical tag, wherein the virtual tag can be associated with the artificial physical tag and metadata can be related to the virtual tag, on the processing system and/or a further processing system, the metadata comprising geopositioning data and/or data acquisition time for the at least one target.

4. The method according to claim 1, wherein the signature is based on a property of the artificial physical tag selected from the group consisting of: temperature, spectral properties, emissivity, surface roughness, dielectricity, polarization, phase data, specific reemitted energy, and combinations thereof.

5. The method of claim 1, further comprising:
detecting the artificial physical tag using a remote sensing imaging technology.

6. The method of claim 1, wherein the artificial physical tag is associated with a tagging material, the tagging material comprising a near-infrared reflective coating.

7. The method of claim 1, further comprising:
tagging the at least one target with an encoded tag,
wherein the artificial physical tag identifies a first property of the at least one target and wherein the encoded tag identifies a second property of the at least one target.

8. The method of claim 1, wherein the optical signature of interest is electromagnetic radiation.

9. The method of claim 1, wherein the optical signature of interest is derived from one or more physical characteristics of the artificial physical tag, and not derived from one or more physical characteristics of the at least one target.

10. The method of claim 1, further comprising:
artificially manipulating the artificial physical tag such that the optical signature of interest is detectable in any specified region of the electromagnetic spectrum.

11. The method of claim 1, wherein the applying step comprises physically affixing the coating to the at least one target.

12. The method of claim 1, wherein the optical signature of interest is an electromagnetic spectral signature different from any electromagnetic spectral signature of any material comprised in the at least one target.

13. The method of claim 1, wherein the virtual tag comprises the optical signature of interest in a digital form.

14. The method of claim 1, wherein the coating is a paint that is both invisible in the visible portion of the electromagnetic spectrum and is reflective in the near-infra-red portion of the electromagnetic spectrum.

15. The method of claim 1, wherein the coating is a near-infrared reflective coating and the optical signature of interest in a region of the electromagnetic spectrum is a spectral signature at one or more wavelengths of the electromagnetic spectrum.

16. The method of claim 3, wherein the electromagnetic radiation comprises electromagnetic radiation selected from the group consisting of: emitted radiation, reflected radiation, absorbed radiation, and combinations thereof.

17. A method of obtaining data from at least one target, the method comprising:

optically detecting a signature of interest in a region of the electromagnetic spectrum from at least one artificial physical tag applied to at least one of a plurality of surfaces on at least one target;

acquiring imagery and/or data related to the at least one target;

generating, by programming running in a processing system, a virtual tag independent of the at least one artificial physical tag, wherein the virtual tag is associated with the at least one artificial physical tag;

processing the acquired imagery and/or data to detect the virtual tag; and relating metadata to the virtual tag, on the processing system or a further processing system, the metadata comprising geopositioning data and/or data acquisition time for the at least one target;

wherein the optically detecting further comprises utilizing a sensing device that illuminates or provides energy to the at least one artificial physical tag, wherein the at least one artificial physical tag scatters the illumination or provided energy, wherein the sensing device detects the scattered energy;

wherein the at least one target comprises a vehicle in a fleet of vehicles; and wherein the acquired imagery and/or data is obtained directly from the at least one target.

18. The method according to claim 17, further comprising:
relating the virtual tag to the at least one artificial physical tag, a portion of the at least one artificial physical tag, and/or the signature of interest.

19. The method according to claim 17, further comprising:
relating the metadata to a portion of the at least one artificial physical tag and/or the signature of interest.

20. The method according to claim 17, wherein the metadata comprises data selected from the group consisting of: time at which the imagery and/or data is acquired, descriptors of the at least one target, and combinations thereof.

21. The method of claim 17, wherein the processing step further comprises:
searching the acquired imagery and/or data using a search engine.

22. The method of claim 17, wherein the acquiring step is performed at the same physical location as the processing step.

23. The method of claim 17, further comprising:
displaying the acquired imagery and/or data pictorially and/or digitally.

24. The method of claim 17, further comprising:
receiving the acquired imagery and/or data,
wherein the acquiring step is performed at a different physical location as the processing step.

25. The method of claim 17, further comprising:
digitally streaming the acquired imagery and/or data.

26. The method of claim 17, further comprising:
searching one or more databases for the virtual tag.

27. The method of claim 17, further comprising:
indexing the acquired imagery and/or data based on the metadata, the virtual tag, the at least one artificial physical tag, and/or the signature of interest; and
creating a searchable group of data based on the indexing.

28. The method of claim 17, wherein at least the processing step is performed by a computer processor that analyzes the acquired imagery and/or data.

29. The method of claim 17, further comprising:
obtaining the metadata based on the virtual tag.

30. The method of claim 17, further comprising obtaining the metadata responsive to detecting the at least one artificial physical tag or a portion thereof in the acquired imagery and/or data.

31. The method of claim 17, wherein the plurality of surfaces is selected from the group consisting of: a hood, a trunk lid, a roof, and combinations thereof.

32. The method of claim 29, wherein the metadata is obtained upon detection of the virtual tag.

33. The method of claim 30, wherein detecting the at least one artificial physical tag or a portion thereof in the acquired imagery and/or data comprises detecting the virtual tag.

34. A method of remote sensing of at least one target, the method comprising:
executing a set of computer-executable instructions stored on one or more non-transitory computer readable media, wherein when executed by at least one processor, the computer-executable instructions carry out the following steps:
detecting at least one target comprising at least one artificial physical tag, wherein the at least one artificial tag comprises an optical signature of interest in a region of the electromagnetic spectrum;
detecting the optical signature of interest by using a light detection and ranging (LIDAR) method based on scattered energy from the at least one artificial physical tag;
acquiring imagery and/or data related to the at least one target;
associating metadata with the at least one artificial physical tag, wherein the metadata comprises geopositioning data and/or data acquisition time for the at least one target;
determining a geopositional location of the at least one target based on the geopositional data; and
utilizing the acquired imagery and/or data to locate the at least one target;
wherein the at least one target comprises a vehicle in a fleet of vehicles; and
wherein the acquired imagery and/or data is obtained directly from the at least one target.

35. The method according to claim 34, further comprising:
providing energy to the at least one artificial physical tag,
wherein the detecting of the optical signature of interest depends on properties of both the at least one artificial physical tag and the provided energy.

36. The method according to claim 34, further comprising:
tagging the at least one target with the at least one artificial physical tag.

37. A system for remote sensing of at least one target, the system comprising:
a set of computer-executable instructions stored on one or more non-transitory computer readable media, wherein when executed by at least one processor, the computer-executable instructions carry out the steps of:
detecting an optical signature of interest in a region of the electromagnetic spectrum provided by an artificial physical tag associated with at least one target;
acquiring imagery and/or data associated with the at least one target by using a remote device that illuminates or provides energy to the artificial physical tag so that the artificial physical tag emits the optical signature as a response to the illuminated or provided energy, wherein the remote device collects electromagnetic radiation of the optical signature, wherein the artificial physical tag scatters the illuminated or provided energy so that the electromagnetic radiation can be collected;
associating metadata with the artificial physical tag, wherein the metadata comprises geopositioning data and/or data acquisition time for the at least one target; and
processing the acquired imagery and/or data to remotely sense the at least one target;
wherein the at least one target comprises a vehicle in a fleet of vehicles; and
wherein the acquired imagery and/or data is obtained from the at least one target.

38. The method according to claim 17, wherein the acquiring step further comprises utilizing one or more physical devices or utilizing one or more data repositories, and
wherein the one or more physical devices comprise one or more cameras, and
wherein the one or more data repositories is selected from the group consisting of: one or more data groups, one or more databases, and combinations thereof.

39. The system of claim 37, wherein the artificial physical tag is affixed to the at least one target.

40. The method according to claim 3, further comprising modifying an electromagnetic spectral signature of any material comprised in the at least one target.

41. A method of obtaining data from acquired imagery and/or data related to at least one target tagged with an artificial physical tag by associating the artificial physical tag to the target, wherein the target comprises a motor vehicle,
wherein the artificial physical tag is configured to provide an optical signature of interest in a region of the electromagnetic spectrum,
wherein a remote sensing device comprises an energy source that illuminates or provides energy to the artificial physical tag of the target, and when the illuminated or provided energy has been scattered by the artificial physical tag, the remote sensing device collects and records the electromagnetic radiation of the signature, which is the scattered energy, that is, imagery and/or data from the target is acquired, wherein the artificial physical tag is a marking paint, which has properties in the infrared wavelength range so that it has a specific spectral signature at certain wavelengths, whereby the signature of interest is provided,
wherein providing an optical signature of interest comprises providing a spectral signature to be recognized by automated or semi-automated imaging processes,
the method comprising:
  generating, during the acquisition of the imagery and/or data from the target, a virtual tag corresponding to the artificial physical tag or a portion of said tag;
  processing the acquired imagery and/or data from the target, wherein the processing comprises:
    detecting the generated virtual tag or a portion of said tag in the acquired imagery and/or data; and
    obtaining metadata based on the detection of the generated virtual tag and linking the metadata to the virtual tag, wherein the obtained metadata comprises a geopositional location of the target and a time at which the imagery and/or data is acquired.

42. The method of claim 41, wherein the remote sensing device detects the electromagnetic radiation of the signature with a spatial resolution of less than 1 meter and a spectral resolution of 10 nanometers.

43. A method of locating at least one motor vehicle, the method comprising:
  applying, to at least one motor vehicle, a paint that is an artificial physical tag, wherein the artificial physical tag is configured to provide an optical signature of interest in a near-infra-red region of the electromagnetic spectrum;
  using a LIDAR sensing device to detect the artificial physical tag, wherein the LIDAR sensing device collects and records energy emitted from the optical signature of interest as a response to electromagnetic energy from the LIDAR sensing device illuminating the artificial physical tag, wherein the tag emission is achieved by scattering the electromagnetic energy;
  obtaining one or more data and/or images of the at least one motor vehicle upon detection of the artificial physical tag;
  relating a geopositional location of the at least one motor vehicle to the artificial physical tag;
  wherein the optical signature of interest is configured to be recognized by automated or semi-automated imaging processes.

* * * * *